Oct. 16, 1945.  M. EGELMAN  2,386,888
PHOTOGRAPHIC PRINTING FRAME
Filed Dec. 26, 1942  2 Sheets-Sheet 2
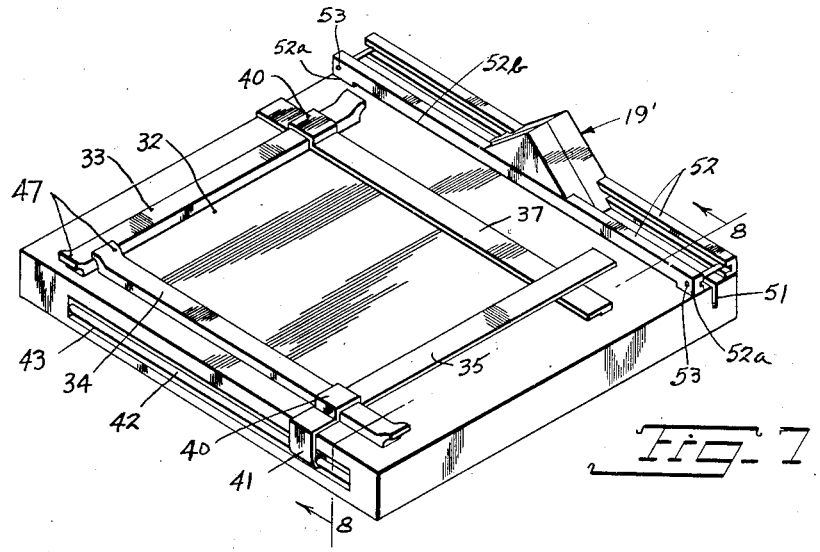
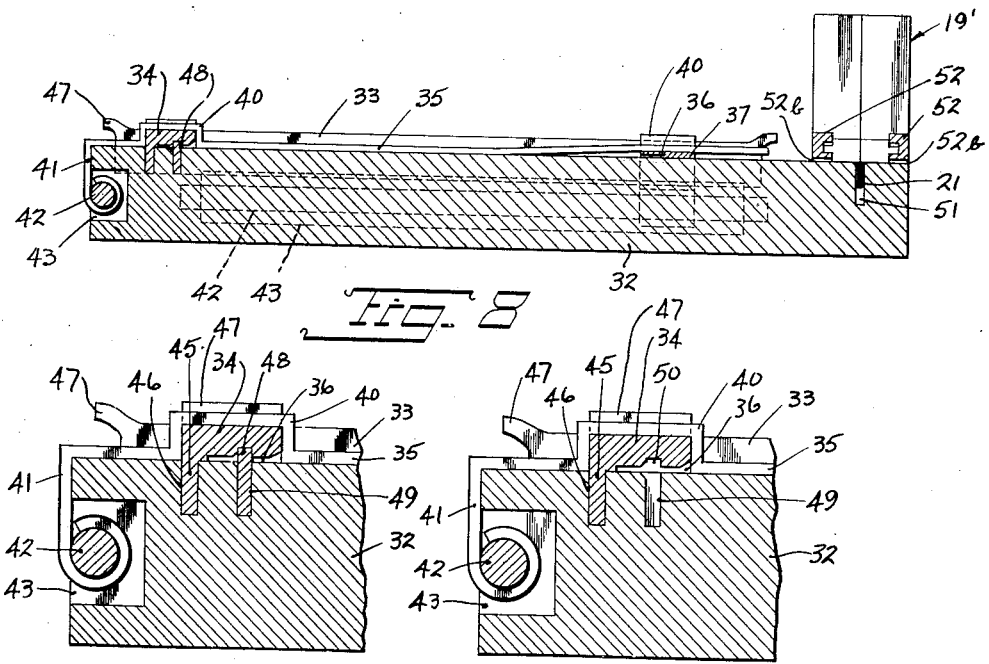
INVENTOR.
MAX EGELMAN
BY
ATTORNEY Patented Oct. 16, 1945

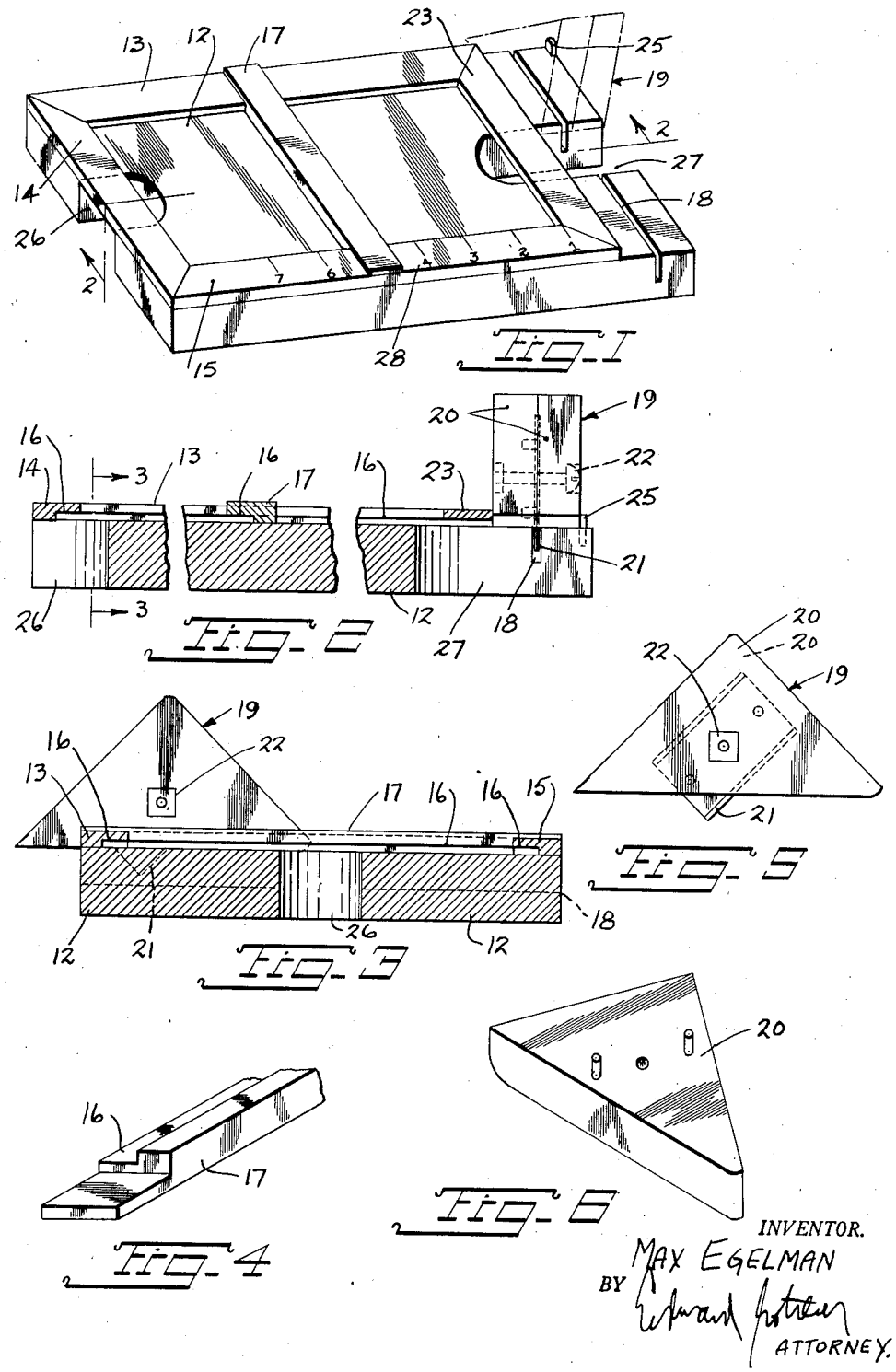

2,386,888

UNITED STATES PATENT OFFICE 2,386,888

PHOTOGRAPHIC PRINTING FRAME

Max Egelman, New York, N. Y.

Application December 26, 1942, Serial No. 470,181

5 Claims. (Cl. 95—77)

This invention relates to new and useful improvements in photographic printing frames.

More particularly, the invention proposes a photographic printing frame which is characterized by masking strips with overhanging inner edges for masking off the border of a photographic print and which is so arranged that the photographic sheet may be conveniently trimmed.

More specifically, the invention contemplates arranging one of the masking strips in such a way that it may be lifted up to allow the photographic paper to be slipped beneath it to the vicinity of a cutter arranged to operate parallel to said latter-mentioned strip so that the photographic paper may be trimmed prior to printing, and slipped back into position so that its edges will be masked to produce the usual border on the finished print.

Prior to this invention printing frames and cutting devices for the prints were made entirely disassociated from each other. The new association of these devices into a compact unit arranged, as will be hereinafter more fully described, makes it very convenient for trimming and photographic printing of sensitized paper.

Another object of the invention is the construction of a device as described which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of the disclosure:

Fig. 1 is a perspective view of a photographic printing frame constructed in accordance with one embodiment of the invention.

Fig. 2 is a longitudinal vertical sectional view taken on the line 2—2 of Fig. 1.

Fig. 3 is a transverse sectional view taken on the line 3—3 of Fig. 2.

Fig. 4 is a fragmentary perspective view of one end of the fourth strip in the device, illustrated bottom side up.

Fig. 5 is an elevational view of the cutter.

Fig. 6 is a perspective view of one section of the cutter.

Fig. 7 is a perspective view of a photographic printing frame constructed in accordance with a modified form of the invention.

Fig. 8 is a vertical sectional view taken on the line 8—8 of Fig. 7.

Fig. 9 is a fragmentary enlarged detailed view of the left hand portion of Fig. 8.

Fig. 10 is a sectional view similar to Fig. 9 but illustrated with one of the parts removed.

The photographic printing frame, in accordance with the form of the invention illustrated in Figs. 1 to 6 inclusive, includes a flat base 12 and three strips 13, 14 and 15 at right angles to each other and mounted on said base 12 and having overhanging inner edge portions 16 for masking off the border upon three sides of a photographic sheet rested on said flat base 12. There is a fourth strip 17 also having an overhanging inner edge 16 for masking off the fourth side of said photographic sheet. This fourth strip 17 is raisable so that the sheet may be slipped under it to one side of the base 12. Cutting means is located on the latter-mentioned side of the base 12 and is disposed parallel to said fourth strip 17.

The cutting means mentioned above includes a groove 18 formed in the base 12 and disposed parallel to the said fourth strip 17 and cooperative with a cutter 19. This cutter 19 comprises a pair of adjacent triangularly shaped blocks 20 sandwiching a razor blade 21 which has a projecting corner extendable into said groove 18. A bolt 22 holds the blocks 20 together so as to firmly hold the blade 21 in position. A fifth strip 23 is fixedly mounted across the ends of the strips 13 and 15 and is disposed parallel to the groove 18 and forms a guide for the cutter 19. A small lug 25 projects from the base 12 and forms another guide for the cutter 19, particularly for the starting position of the cutter.

The base 12 has cutout portions 26 and 27 formed in its ends and extending beneath the strips 14 and 23 for facilitating gripping of a photographic sheet with the fingers on the top and bottom so that it may be conveniently slipped across the face of the flat base 12. Suitable scales 28 may be imprinted on one or more of the strips of the printing frame.

The operation of the device is as follows:

A piece of photographic paper of suitable width may be slipped into the printing frame from the right hand side by slipping it beneath the strip 23 and then moving it towards the left hand of the frame. If moved completely to the left three sides of the photographic paper will be engaged beneath the overhanging edge portions 16 of the strips 13, 14 and 15, respectively. The fourth strip 17 may be shifted right or left to a selected position for a print of a desired size. The photographic paper may be suitably trimmed, if need be, by first lifting the fourth strip 17 so that it may be slipped to the right, then placing its right hand end in proper position over the groove 18, and finally moving the cutter 19 to trim same off. The print is then moved to the left and its edges are masked by said four strips, and it is then photographically exposed.

In Figs. 7 to 10, a modified form of the invention has been disclosed distinguishing essentially from the prior form in the fact that two of the strips are adjustable so that the printing frame may be used for various sizes of paper differing in both length and width. In this form of the invention the printing frame includes a flat base 32 provided with three strips 33, 34 and 35 at right angles to each other and mounted on the base 32 and having overlapping inner edge portions 36 for masking off the border on three sides on a photographic sheet rested on said flat base. A fourth strip 37 having an overhanging inner edge 36 for masking off the fourth side of said photographic sheet is raisable, so that said sheet may be slipped under it and moved to one side of the base 32. Cutter means is located on the latter-mentioned side of the base 32 and is disposed parallel to said fourth strip.

In this form of the invention the strip 35 is also adjustably mounted so that a photographic sheet may be masked off in width as well as in length. The strip 35 has a raised portion 40 which slidably engages over the strip 34. The strip 35 also has a side portion 41 turned around a stationary rod 42 located within a cavity 43 formed in one side of the base 32. The strip 37 is also provided with a raised portion 40 which slidably engages over the strip 33. The strip 37 also has a side portion 41 slidably engaging a rod 42 mounted in a recess 43 formed in another one of the sides of the base 32.

The strips 33 and 34 are removably mounted on the base 32. Each of these strips has a downwardly extending rib portion 45 which frictionally engages a complementary groove 46 formed in the base 32. The end portions 47 of the strips 33 and 34 are raised so that the strips may be easily gripped and pulled upwards off of the flat base. Beneath the strips 33 and 34 there are removable auxiliary strips 48 set into grooves 49 formed in the base 32. These removable auxiliary strips project upwards into grooves 50 formed on the bottom sides of the strips 33 and 34. When the auxiliary strips 48 are in position the overhanging inner edge portions 36 are restricted, forming smaller borders for the photographic sheet than when the auxiliary strips 48 are removed. This may be clearly understood by examining Figs. 9 and 10.

The cutter means which is associated with the base 32 includes a groove 51 disposed parallel to the strip 37. Tracks 52 are mounted upon the base 32 along each of the sides of the groove 51. A cutter 19' is slidably mounted upon the tracks 52 and has a projecting blade 21 which normally engages the groove 51. Pins 53 are mounted across the ends of the tracks 52 to limit sliding of the cutter 19' so that it may not be removed, though the cutter is free to slide the complete length of the tracks 52.

The operation of this form of the invention is as follows:

A photographic sheet may be rested on the base 32 and engaged against the strips 33 and 34. The strips 35 and 37 may be moved so as to suitably engage over the other two edges of the photographic sheet. Thus a suitable border may be masked upon the edges of the photographic sheet. When trimming is needed, the strip 37 may be flexed upwards and a photographic sheet slipped under and slipped to a position beneath the tracks 52. It should be noted that the tracks 52 are supported at their end portions 52a. Along their lengths the tracks 52 are slightly elevated above the top of the flat base 32 forming spaces 52b. This permits the photographic sheet to be slipped beneath the tracks and then the cutter 19' may be operated to trim the edges of the sheet. Of course, it is necessary to turn the photographic sheet around when it is desired to trim more than one of the edges of the sheet. The edges of the trimmed sheet are then masked by said four strips, and the sheet may now be photographically printed. It should be clearly understood that a dominant feature of the invention resides in the fact that a photographic sheet may be conveniently trimmed and photographically printed with a border by using the instant photographic printing frame.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In a photographic printing frame, a rectangularly shaped flat base having side grooves extended inwards from two adjacent side edges of said base and having top grooves in its top face extended along and spaced inwards and parallel to said two adjacent side edges, two masking strips at right angles to each other and disposed on the top face of said base and having outer and bottom rib portions engaging into said top grooves for holding the masking strips in position, and two more masking strips at right angles to each other and disposed on the top face of said base and having their outer ends slidably mounted in said side grooves.

2. In a photographic printing frame a rectangularly shaped flat base having side grooves extended inwards from two adjacent side edges of said base and having top grooves in its top face extended along and spaced inwards and parallel to said two adjacent side edges, two masking strips at right angles to each other and disposed on the top face of said base and having outer and bottom rib portions engaging into said top grooves for holding the masking strips in position, two more masking strips at right angles to each other and disposed on the top face of said base and having their outer ends slidably mounted in said side grooves, and two auxiliary strips disposed beneath said first two named masking strips and set into grooves formed in the bottom of said first two named masking strips and grooves in the top face of said base.

3. In a photographic printing frame, a rectangularly shaped flat base having side grooves extended inwards from two adjacent side edges of said base and having top grooves in its top face extended along and spaced inwards and parallel to said two adjacent side edges, two masking strips at right angles to each other and disposed on the top face of said base and having outer and bottom rib portions engaging into said top grooves for holding the masking strips in position, and two more masking strips at right angles to each other and disposed on the top face of said base and having their outer ends slidably mounted in said side grooves, the ends of said first two named masking strips being raised to facilitate their removal.

4. In a photographic printing frame, a rectangularly shaped flat base having side grooves extended inwards from two adjacent side edges of said base and having top grooves in its top face extended along and spaced inwards and parallel to said two adjacent side edges, two masking strips at right angles to each other and disposed on the top face of said base and having outer and bottom rib portions engaging into said top grooves for holding the masking strips in position, and two more masking strips at right angles to each other and disposed on the top face of said base and having their outer ends slidably mounted in said side grooves, said second two named masking strips having raised portions extending over said first two named masking strips.

5. In a photographic printing frame, a rectangularly shaped flat base having side grooves extended inwards from two adjacent side edges of said base and having top grooves in its top face extended along and spaced inwards and parallel to said two adjacent side edges, two masking strips at right angles to each other and disposed on the top face of said base and having outer and bottom rib portions engaging into said top grooves for holding the masking strips in position, and two more masking strips at right angles to each other and disposed on the top face of said base and having their outer ends slidably mounted in said side grooves, rods being mounted within and across the ends of said side grooves and the outer ends of said second named two masking strips being slidably connected with said rods.

MAX EGELMAN.